March 17, 1959
R. ATTKINS
2,877,492
METHOD AND APPARATUS FOR THE MANUFACTURE OF
CONTINUOUS CONSUMABLE ELECTRODES
Filed March 25, 1955
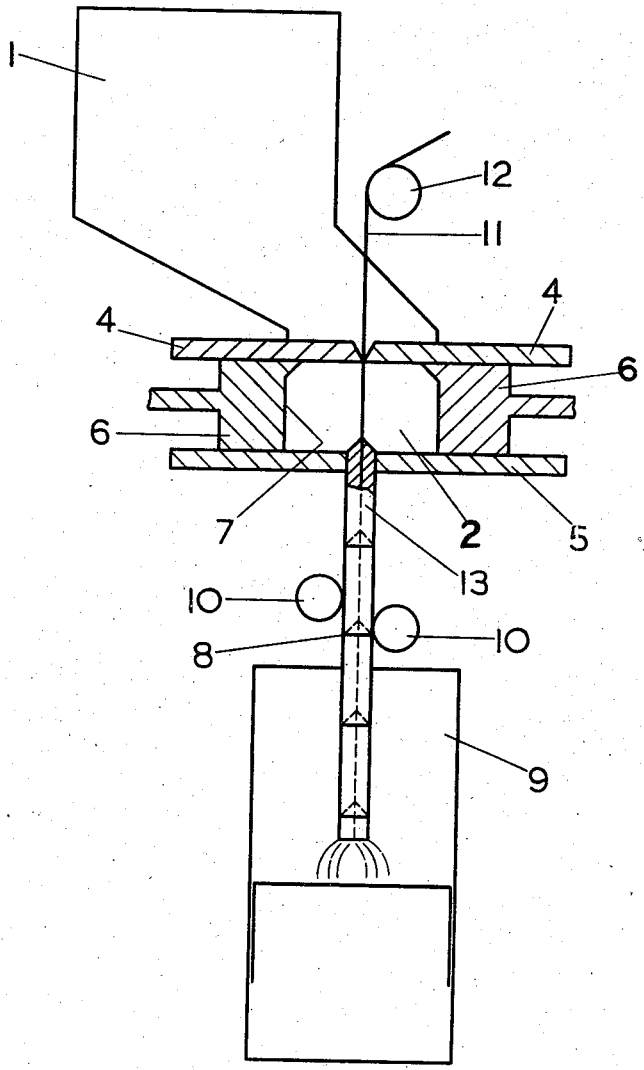
INVENTOR
ROY ATTKINS
BY Cushman, Darby & Cushman
ATTORNEYS

United States Patent Office 2,877,492
Patented Mar. 17, 1959

2,877,492

METHOD AND APPARATUS FOR THE MANUFACTURE OF CONTINUOUS CONSUMABLE ELECTRODES

Roy Attkins, Yardley, Birmingham, England, assignor to Imperial Chemical Industries Limited, London, England, a corporation of Great Britain Application March 25, 1955, Serial No. 496,672

Claims priority, application Great Britain April 21, 1954

9 Claims. (Cl. 18—5)

This invention relates to an improved process and apparatus for use in the arc-melting of high melting point reactive metals and alloys, such for example as titanium, zirconium, thorium, hafnium, tantalum, molybdenum, chromium and their alloys.

In one method for the continuous arc-melting of such metals and alloys in a cooled crucible, the raw material to be melted is fed to the crucible in the form of a consumable electrode introduced from above, with or without an additional feed of raw material in for example sponge or powder form into the crucible. An arc is struck between this electrode and an initial small charge of the metal in the crucible and subsequently maintained between the electrode and the surface of the molten metal, to provide the heat required for progressive melting of the electrode material.

In the application of this method as hitherto practised, it has been customary to form the consumable electrode from short preformed compacts made from the raw material in suitably divided form, which are either welded together into an electrode of the required length which is then fed into the furnace, or fed continuously from a magazine to a welding station located above the furnace and the welded product fed to the furnace. These methods involve the employment of a welding operation, handling of the compacts, and the possibility of disalignment during welding which complicates the subsequent supply of melting current to the electrode.

It is the object of the present invention to provide an improved method by which a continuous electrode can be formed more conveniently direct from the divided raw material and without the necessity for a welding operation.

According to the present invention, we provide a stepwise process for manufacturing consumable electrodes for use in the arc-melting of metals and alloys of the kind described, comprising passing a continuous wire, strip or the like of a suitable metal or alloy in stepwise manner through a die chamber, supplying to the said chamber a charge of raw material of the metal or alloy to be melted in divided form, applying pressure to the said charge by means of shaped die members to form a compacted electrode segment around and mechanically secured to the portion of the said wire, strip or the like within the die chamber, opening the die, and withdrawing the segment of composite electrode therefrom.

The invention also comprises apparatus for carrying out the said process.

If desired, heat may be applied in addition to pressure in the compacting operation.

Preferably, the configuration of the wire, strip or the like is such as to provide a positive mechanical keying of the compacted member thereto. Thus for example serrated wire may be used, or perforated, embossed, or dimpled strip, or a strip of expanded metal.

The wire, strip or the like may have substantially the same composition as the metal or alloy raw material which is to be melted. Alternatively, it may be used as a convenient means for the incorporation of alloying ingredients into the melt, by forming it either from a master alloy of the basis metal and the required alloying ingredient or ingredients, or from an alloying ingredient or alloy of two or more such ingredients, the composition of the alloy and/or the relative dimensions of the insert being selected to give the required alloying ingredient proportions in the melt.

Preferably also the ends of the segments are shaped so that they are adapted to engage with the ends of the adjacent segments in order to increase the rigidity and continuity of the complete electrode. Thus for example the pressure members of the die may have their inner surfaces so shaped that the compacted segment is provided with a tapered upper extremity, and on withdrawing the segment from the die, the distance of withdrawal is adjusted so that the tapered portion remains within the die and in the succeeding compacting operation serves as an insert round which the next segment is compacted, forming a socket in the base thereof.

By means of this process, discrete electrodes of any required length can be built up, separated, and subsequently fed into the melting furnace. Preferably, however, the electrode as it is formed is fed directly into the furnace until the required ingot size is built up, or indefinitely in the case of continuous melt-casting. The hopper and compacting die are located above the crucible furnace. Driven guide rolls serve to withdraw the composite electrode from the die and feed it to the furnace. The compacting process is carried out in the die chamber during a period when the electrode in the furnace is stationary, the length of each segment being governed by the effective variation in arc length or a multiple thereof.

If desired, a plurality of compacting dies may be employed to form a plurality of electrodes which are fed simultaneously into the same melting furnace.

The invention is illustrated but not limited by the accompanying diagrammatic drawing, showing in vertical part section apparatus for the production of a continuous consumable titanium electrode which is then fed into an arc melting furnace.

Referring to the drawing, the apparatus comprises a hopper 1 containing the titanium raw material to be melted in divided, e. g. sponge or powder, form, in communication with the die chamber 2 formed by base plate 5, power-operated punch members 6 and horizontal slide members 4. Access to the die chamber is controlled by the horizontal slide members 4 which when in the closed position form the upper enclosing surface of the die chamber. The base 5 of the die is apertured to permit extraction of the compacted electrode member and the die is completed by the power-operated punch members 6 with inner faces 7 of the required configuration which effect the compacting operation.

The drawing shows a melting operation in progress. The train 8 of segments, with their ends engaging, is fed into the melting crucible 9 by the driven rolls 10, which also serve as withdrawal rolls in relation to the compacting die. The electrode is progressively melted by means of the arc maintained between it and the pool of molten titanium in the crucible.

In operation, a continuous length of titanium wire 11 is fed over the guide roll 12 and centrally through the die. The wire is held stationary whilst the die chamber 2 is filled with titanium sponge from the hopper, the slide members 4 (which have sufficient clearance for the passage of the wire) are closed, the punch members 6 set in operation and the compact formed. The members 6 are then retracted; the rolls 10 set in motion and the compacted segment withdrawn at a speed conforming to the rate of melting employed until it reaches the position occupied by segment 13 in the drawing. The electrode is then held stationary while a new segment is compacted.

I claim:

1. Process for the manufacture of consumable electrodes for use in the arc melting of metals comprising: intermittently advancing continuous metal connecting means into a die chamber, supplying the die chamber with successive charges of particulate metallic material to surround each new length of connecting means, radially compressing the successive charges of particulate material about the connecting means to form an electrode segment having an outwardly tapered upper extremity and to attach the segment to the connecting means, and withdrawing each successively compressed segment from the die chamber leaving only the tapered extremity remaining therein, whereby the next formed segment will have a socket-like lower extremity which mates with and engages to the outwardly tapered extremity of the segment preceding.

2. Process in accordance with claim 1 in which heat is applied in addition to pressure to the charge in the die chamber during the compacting operation.

3. Process in accordance with claim 1 wherein said connecting means comprises a wire to provide a positive mechanical keying of the electrode segment thereto.

4. Process in accordance with claim 1 wherein said connecting means comprises a perforated, embossed, or dimpled strip.

5. Process in accordance with claim 1 wherein said connecting means comprises expanded metal.

6. Process in accordance with claim 1 wherein said connecting means is substantially the same composition as the metal or alloy raw material which is to be melted.

7. Process in accordance with claim 1 wherein said connecting means is formed from a master alloy of the basic metal and one or more alloying elements required in the final alloy.

8. Apparatus for the manufacture of continuous consumable electrodes for use in the arc-welding of metals and alloys comprising a compacting die having an apertured base member, radially movable punch members, and laterally retractable top closure members, said base member, punch members and top closure members defining a die chamber, means for guiding a continuous metal connecting element centrally through said die chamber, said connecting element entering between said top closure members and leaving through the base member aperture, means for supplying successive charges of particulate metallic material to said die chamber between said top closure members when in retracted position, and means for withdrawing a continuous metallic compact through the base member aperture in stepwise fashion.

9. Apparatus for the manufacture of continuous consumable electrodes for use in the arc-welding of metals and alloys comprising a compacting die having an apertured base member, radially movable punch members, and laterally retractable top closure members, said base member, punch members and top closure members defining a die chamber, means for guiding a continuous metal connecting element centrally through said die chamber, said connecting element entering between said top closure members and leaving through the base member aperture, means for supplying successive charges of particulate metallic material to said die chamber between said top closure members when in retracted position, and means for withdrawing a continuous metallic compact through the base member aperture in stepwise fashion, said withdrawing means being effective also to feed said connecting element into the die chamber.

References Cited in the file of this patent

UNITED STATES PATENTS

| | | |
|---|---|---|
| 2,300,302 | Morin | Oct. 27, 1942 |
| 2,457,459 | Gloor | Dec. 28, 1948 |
| 2,708,770 | Herres et al. | May 24, 1955 |